US009998523B2

(12) United States Patent
Lee

(10) Patent No.: US 9,998,523 B2
(45) Date of Patent: Jun. 12, 2018

(54) METHOD FOR CONTROLLING FILE NAME AND ELECTRONIC DEVICE THEREOF

(71) Applicant: Samsung Electronics Co., Ltd, Gyeonggi-do (KR)

(72) Inventor: Ha-Na Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 14/140,270

(22) Filed: Dec. 24, 2013

(65) Prior Publication Data

US 2014/0181269 A1 Jun. 26, 2014

(30) Foreign Application Priority Data

Dec. 24, 2012 (KR) ........................ 10-2012-0152318

(51) Int. Cl.

*H04L 29/08* (2006.01)
*G06Q 10/10* (2012.01)
*H04L 12/58* (2006.01)

(52) U.S. Cl.

CPC ........... *H04L 67/06* (2013.01); *G06Q 10/107* (2013.01); *H04L 51/08* (2013.01)

(58) Field of Classification Search

CPC ....... H04L 67/06; H04L 51/08; H04L 12/584; H04L 51/04; H04L 67/2823; H04L 69/22; H04L 51/38; G06Q 10/107; H04M 1/72547; H04M 1/72552; H04M 1/72527; H04M 2250/64; H04M 1/274508; H04M 1/72555; H04M 2203/254; H04M 3/42382; G06F 15/16; G06F 17/30014; G06F 17/30882; G06F 21/10; G06F 3/0481; G06F 3/04842; H04N 1/00212; H04N 1/00209; H04N 1/32128; H04N 2201/0094; H04N 2201/3226; H04N 1/00307;

(Continued)

(56) References Cited

U.S. PATENT DOCUMENTS 7,089,286 B1 8/2006 Malik
7,913,053 B1 * 3/2011 Newland .............. G06Q 10/107 173/165

(Continued)

FOREIGN PATENT DOCUMENTS

CN 101059813 A 10/2007
EP 1591903 A1 11/2005

(Continued)

OTHER PUBLICATIONS

International Search Report dated Mar. 11, 2014 in connection with International Patent Application No. PCT/KR2013/010548, 3 pages.

(Continued)

*Primary Examiner* — Greg C Bengzon

(57) ABSTRACT

A method for controls a file name in an electronic device. The method includes when a data transmission event occurs, detecting at least one file for attachment to data transmission; determining whether a renamed file exists among the at least one file; when at least one renamed file exists, generating a header in consideration of a changed name with respect to the at least one renamed file; and generating and transmitting a data packet including the header.

20 Claims, 18 Drawing Sheets

(58) Field of Classification Search
CPC ....... H04N 2201/3266; H04N 1/00204; H04N 1/00217; H04N 1/2179; H04N 1/00244; H04N 1/00474; H04N 1/32411; H04N 2201/3277
See application file for complete search history.

(56) References Cited

U.S. PATENT DOCUMENTS

2002/0016818 A1* 2/2002 Kirani ............... G06F 17/30902 709/203
2002/0072967 A1* 6/2002 Jacobs ................. G06Q 10/107 705/14.66
2003/0009528 A1* 1/2003 Sharif ................... H04L 69/329 709/206
2003/0160815 A1* 8/2003 Muschetto ............ G06F 3/0481 715/733
2003/0182323 A1* 9/2003 Demsky ............ G06F 17/30014
2003/0185191 A1* 10/2003 Nagatomo .......... H04L 12/5835 370/338
2003/0233422 A1* 12/2003 Csaszar ................ G06Q 10/107 709/206
2004/0003398 A1* 1/2004 Donian ................... G06F 21/10 725/34
2004/0068545 A1* 4/2004 Daniell ................... H04L 51/00 709/206
2004/0133647 A1* 7/2004 Ozkan ................... G06F 3/0481 709/206
2005/0011958 A1* 1/2005 Fukasawa ......... G06F 17/30879 235/462.46
2005/0091330 A1* 4/2005 Malik .................. G06Q 10/107 709/207
2005/0102361 A1* 5/2005 Winjum ............... G06Q 10/107 709/206
2005/0267937 A1* 12/2005 Daniels ................... H04L 12/58 709/206
2005/0289149 A1* 12/2005 Carro ................... G06Q 10/107
2005/0289446 A1* 12/2005 Moncsko .......... G06F 17/30882 715/208
2006/0075046 A1* 4/2006 Yozell-Epstein .... G06Q 10/107 709/206
2006/0089931 A1* 4/2006 Giacobbe ............. G06Q 10/107
2006/0173867 A1* 8/2006 Gaucas ................ G06Q 10/107
2006/0184522 A1* 8/2006 McFarland ........... G06F 21/608
2006/0271688 A1* 11/2006 Viger .................... H04L 63/101 709/227
2006/0288123 A1* 12/2006 Vered ...................... H04L 29/06 709/246
2007/0016613 A1* 1/2007 Foresti ................. G06Q 10/107
2007/0050711 A1* 3/2007 Walker .............. G06F 17/30855 715/205
2007/0086061 A1* 4/2007 Robbins ............. H04N 1/32133 358/400
2007/0136328 A1* 6/2007 Carro ................... G06Q 10/107
2007/0244977 A1* 10/2007 Atkins ................. G06Q 10/107 709/206
2007/0250544 A1 10/2007 Shibata et al.
2007/0255792 A1* 11/2007 Gronberg ............ H04L 12/5835 709/206
2008/0140783 A1* 6/2008 Williams ................ H04L 12/58 709/206
2008/0162651 A1* 7/2008 Madnani .............. G06Q 10/107 709/206
2008/0172663 A1* 7/2008 Lee ........................ H04L 51/38 717/173
2008/0189373 A1* 8/2008 Ikonen .................. H04L 12/583 709/206
2008/0244092 A1* 10/2008 Kosaka .............. H04L 12/5835 709/246
2009/0005087 A1* 1/2009 Lunati ................. H04L 67/2823 455/466
2009/0030991 A1* 1/2009 Vakkalanka ......... G06Q 10/107 709/206
2009/0100079 A1* 4/2009 Yoshioka ............. G06Q 10/107
2009/0307322 A1* 12/2009 Iwasawa .............. G11B 27/034 709/206
2009/0313348 A1* 12/2009 Plestid .................. H04L 51/063 709/217
2009/0319618 A1* 12/2009 Affronti ............... G06Q 10/107 709/206
2010/0011077 A1* 1/2010 Shkolnikov ........... H04L 12/583 709/206
2010/0011078 A1* 1/2010 Shkolnikov ........... H04L 12/583 709/206
2010/0277635 A1 11/2010 Kim
2010/0313250 A1* 12/2010 Chow ............... G06F 17/30899 726/5
2011/0173284 A1 7/2011 Carro
2011/0185024 A1* 7/2011 Ramarao ............. G06Q 10/107 709/206
2011/0283198 A1* 11/2011 Rybak ................... H04L 51/066 715/738
2012/0011444 A1* 1/2012 Morris .................. H04L 12/584 715/738
2012/0102077 A1 4/2012 Lee
2012/0110097 A1* 5/2012 Singh ...................... H04L 51/14 709/206
2012/0290404 A1* 11/2012 Chuang ................... H04L 51/14 705/14.69
2012/0314262 A1* 12/2012 Isoda ................. H04N 1/00225 358/402
2013/0016394 A1* 1/2013 Isoda ................... H04N 1/4486 358/1.15
2013/0036363 A1* 2/2013 Johnson .............. G06F 21/6245 715/738
2013/0166660 A1* 6/2013 Chung .................... H04L 51/08 709/206
2013/0173754 A1* 7/2013 van Os ................... H04L 67/02 709/219
2013/0179771 A1* 7/2013 Dent .................... G06Q 10/107 715/234
2013/0254314 A1* 9/2013 Chow ..................... H04L 67/06 709/206
2014/0007222 A1* 1/2014 Qureshi .................. G06F 21/10 726/16
2014/0164093 A1* 6/2014 Libman ............. G06Q 30/0277 705/14.39
2014/0317210 A1* 10/2014 Song ..................... G06F 3/0481 709/206

FOREIGN PATENT DOCUMENTS

JP 2001-306378 11/2001
JP 2002189746 A 7/2002
JP 2003036193 A 2/2003
JP 2005258613 A 9/2005
KR 10-2010-0118887 11/2010
KR 10-2012-0041452 5/2012

OTHER PUBLICATIONS

Written Opinion of International Searching Authority dated Mar. 11, 2014 in connection with International Patent Application No. PCT/KR2013/010548, 4 pages.
Extended European Search Report dated Mar. 6, 2014 in connection wtih European Application No. 13197478.4, 9 pages.
Michael Elkins, “The Mutt E-mail Client, version 1.0pre2”, Internet Citation, Sep. 1999, XP-002245042, 84 pages.
R. Troost, et al, “Network Working Group Communicating Presentation Information in Internet Mesages: The Content-Disposition Header Field”, Aug. 1, 1997, XP055103779, 12 pages.
Communication pursuant to Article 94(3) EPC dated Jun. 24, 2016 in connection with European Patent Application No. 13 197 478.4.
Summons to attend oral proceedings pursuant to Rule 115(1) EPC dated Apr. 19, 2017 in connection with European Patent Application No. 13 197 478.4.
Japanese Notice of Preliminary Rejection for Japanese Application No. 2013-187077, dated Sep. 11, 2017. (8 pages).

(56) References Cited

OTHER PUBLICATIONS

Decision to refuse a European Patent application, dated Nov. 24, 2017, regarding Application No. 13197478.4, 23 pages.
Notice of Final Rejection, dated Dec. 18, 2017, regarding Application No. JP2013-187077, 6 pages.
Communication from a foreign patent office in a foreign counterpart application, The State Intellectual Property Office of P.R. China, "The First Office Action," Chinese Application No. 201310723573.2, Mar. 20, 2018, 18 pages.

* cited by examiner

841

| | ORIGINAL FILE INFORMATION | | | CHANGED FILE INFORMATION | |
|---|---|---|---|---|---|
| FLAG | FILE DIRECTORY | FILE FORMAT | FILE NAME | FILE FORMAT | FILE NAME |
| 1 | Phone₩Pictures | .jpg | Screenshot_2012-11-20-07 | .jpg | COUPON |
| | Phone₩sound | .mp3 | bell | | |
| ... | ... | ... | ... | ... | ... |

1ST TABLE 851

| FLAG (853) | ORIGINAL FILE INFORMATION | | | CHANGED FILE INFORMATION | |
|---|---|---|---|---|---|
| | FILE DIRECTORY | FILE FORMAT | FILE NAME | FILE FORMAT | FILE NAME |
| 1 (855) | Phone₩Pictures | .jpg | Screenshot_2012-11-20-07 | .jpg | COUPON |
| | Phone₩sound | .mp3 | bell | | |
| | ... | ... | ... | ... | ... |

2ND TABLE 861

| FLAG (863) | ORIGINAL FILE INFORMATION | | | CHANGED FILE INFORMATION | |
|---|---|---|---|---|---|
| | FILE DIRECTORY | FILE FORMAT | FILE NAME | FILE FORMAT | FILE NAME |
| (855) | Phone₩video | .avi | 20121225 | | |
| | Phone₩sound | .mp3 | Alphabet Song | | |
| | ... | ... | ... | ... | ... |

3ND TABLE 871

| FLAG (873) | ORIGINAL FILE INFORMATION | | | CHANGED FILE INFORMATION | |
|---|---|---|---|---|---|
| | FILE DIRECTORY | FILE FORMAT | FILE NAME | FILE FORMAT | FILE NAME |
| 1 (875) | Phone₩myfiles | .hwp | memo | .hwp | Phone number |
| | Phone₩Pictures | .jpg | 20121113 | .jpg | cover |
| | ... | ... | ... | ... | ... |

FIG.8C

METHOD FOR CONTROLLING FILE NAME AND ELECTRONIC DEVICE THEREOF

CROSS-REFERENCE TO RELATED APPLICATION(S) AND CLAIM OF PRIORITY

The present application is related to and claims priority under 35 U.S.C. § 119 to an application field in the Korean Intellectual Property Office on Dec. 24, 2012 and assigned Serial No. 10-2012-0152318, the contents of which are incorporated herein by reference.

TECHNICAL FIELD OF THE DISCLOSURE

The present disclosure relates to a method for controlling a file name and an electronic device thereof.

BACKGROUND

Electronic devices have become necessary articles of modern persons due to their portability, and evolve into multimedia devices that provide various services such as voice and video call functions, a message transmission/reception function, an information input/output function, and a data transmission function.

In the case of transmitting data to another electronic device through the various services as described above, an electronic device's user may perform attachment of at least one file stored in a memory to transmit the data. When an event for transmitting data including a file occurs, the electronic device generates a data packet in consideration of the name of the file stored in the memory and transmits the data to the another electronic device. Therefore, the electronic device's user releases the attachment of the attached file in order to rename the attached file. Thereafter, the electronic device finds the at least one file stored in the memory of the electronic device and renames the file. Thereafter, the electronic device's user needs to perform an operation of again performing attachment of the renamed file.

As described above, when a file is required to be renamed after attachment of the file for data transmission in an application program of the electronic device, the electronic device's user needs to perform five manipulations.

SUMMARY

To address the above-discussed deficiencies of the prior art, it is a primary object to provide at least the advantages below. Accordingly, an object of the present disclosure is to provide an apparatus and method for controlling a file name in an electronic device.

Another object of the present disclosure is to provide an apparatus and method for renaming an attached file in an electronic device.

Another object of the present disclosure is to provide an apparatus and method for generating a header for data transmission in consideration of the changed name of an attached file in an electronic device.

Another object of the present disclosure is to provide an apparatus and method for managing an attached file using a table in an electronic device.

Another object of the present disclosure is to provide an apparatus and method for detecting whether an attached file is renamed in an electronic device.

Another object of the present disclosure is to provide an apparatus and method for detecting whether an attached file is renamed using a flag in an electronic device.

According to an aspect of the present disclosure, a method for controlling a file name in an electronic device includes: when a data transmission event occurs, detecting at least one file for attachment to data transmission; determining whether a renamed file exists among the at least one file; when at least one renamed file exists, generating a header in consideration of a changed name with respect to the at least one renamed file; and generating and transmitting a data packet including the header.

According to another aspect of the present disclosure, an electronic device includes: at least one processor; at least one memory; and at least one program stored in the memory and configured to be executable by the processor, wherein the processor, when a data transmission event occurs, detects at least one file for attachment to data transmission; determining whether a renamed file exists among the at least one file; when at least one renamed file exists, generating a header in consideration of a changed name with respect to the at least one renamed file; and generating and transmitting a data packet including the header.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A to 8C illustrate a table for management of attached files in an electronic device according to an exemplary embodiment of the present disclosure;

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

The present disclosure provides a technique for generating a header in consideration of the changed name of an attached file in an electronic device.

In the following description, examples of the electronic device may include a mobile communication terminal having a touchscreen, a personal digital assistant (PDA), a personal computer (PC), a laptop computer, a smart phone, a netbook, a television, a mobile internet device (MID), an ultra mobile personal computer (UMPC), a tablet PC, a navigation device, a smart TV, and an MP3 player.

Figure 1:
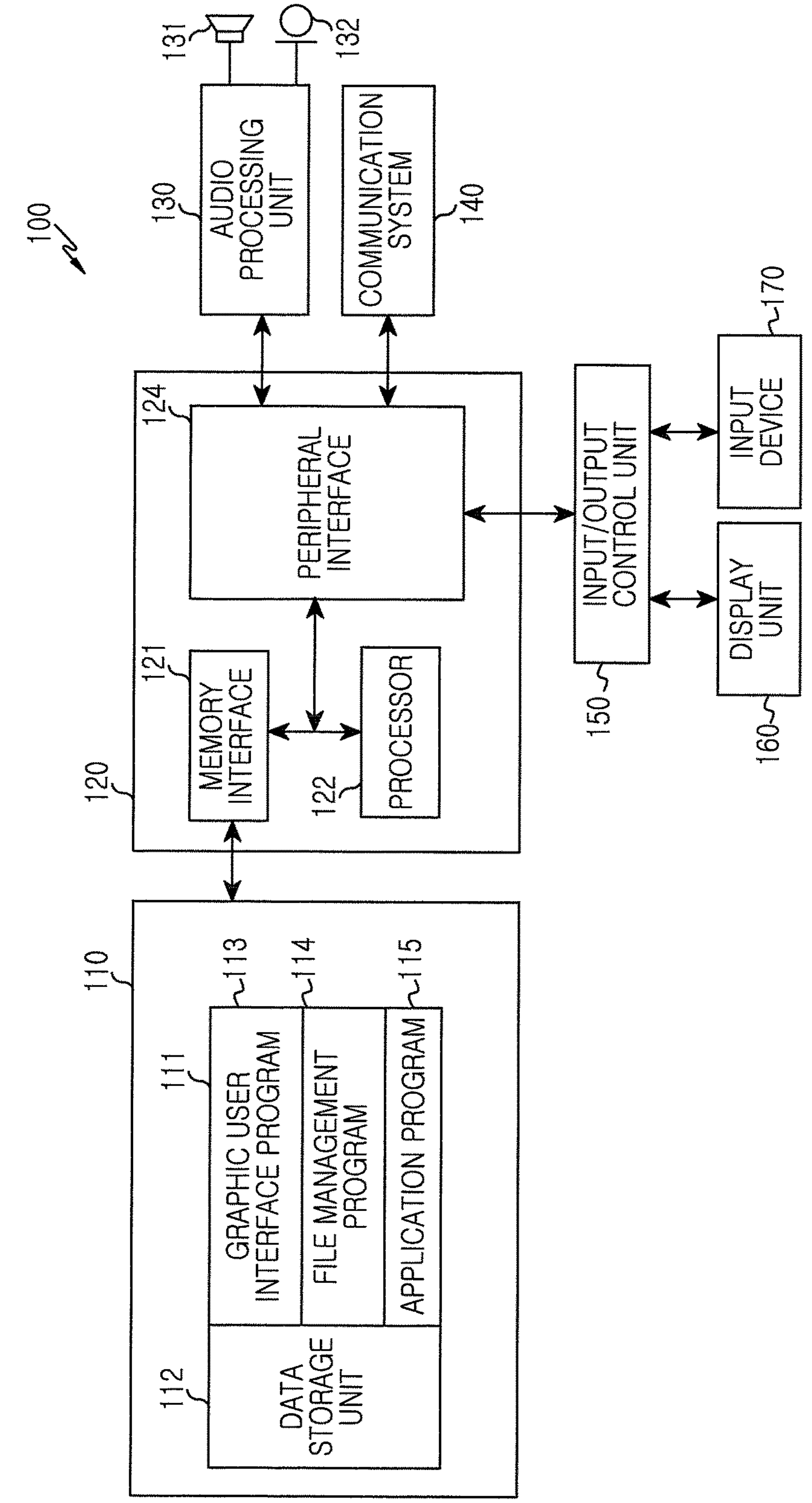
FIG. 1 illustrates a block diagram of an electronic device according to an exemplary embodiment of the present disclosure.

FIG. 1 illustrates a block diagram of an electronic device according to an exemplary embodiment of the present disclosure.

Referring to FIG. 1, the electronic device 100 may include a memory 110, a processor unit 120, an audio processing unit 130, a communication system 140, an input/output control unit 150, a display unit 160, and an input device 170. In this case, the memory 110 may be provided in plurality.

The respective components will be described below.

The memory 110 may include a program storage unit 111 for storing a program for controlling an operation of the electronic device 100 and a data storage unit 112 for storing data generated during the execution of a program.

Herein, the data storage unit 112 stores a file management table 801 including an original file information field 803 including the file directory field 807 of an original file, the file format field 809 of the original file and the file name field 811 of the original file, and a changed file information field 805 including the file format field 813 of a changed file and the file name field 815 of the changed file.

For example, the program storage unit 111 includes a Graphic User Interface (GUI) program 113, a file management program 114 and at least one application program 115. In this case, the programs stored in the program storage unit 111 may be expressed as an instruction set that is a collection of instructions.

Figure 9A:
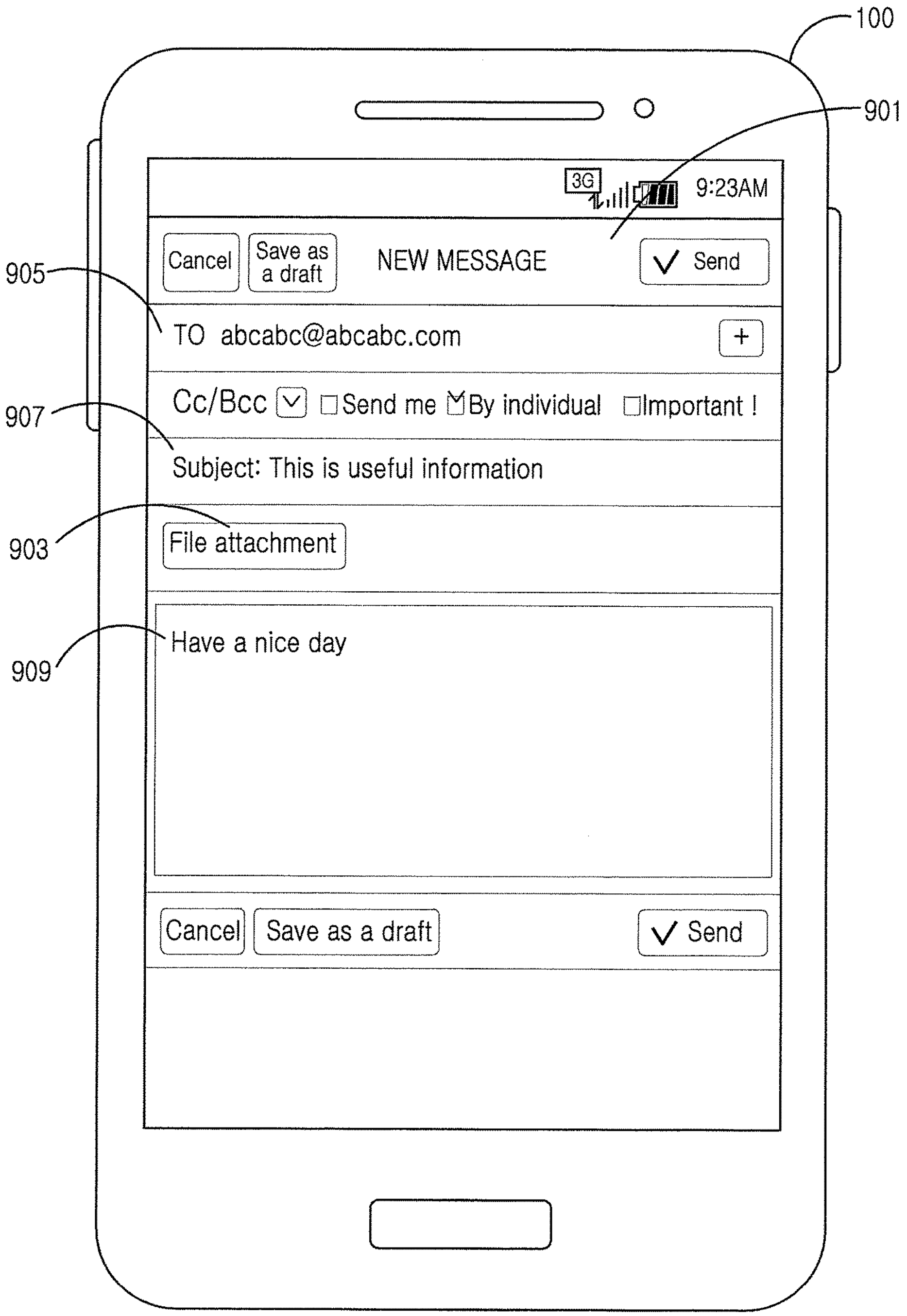
FIGS. 9A to 9F illustrate screen configurations for generating a header in consideration of the changed name of an attached name in an electronic device according to an embodiment of the present disclosure.
Figure 9B:
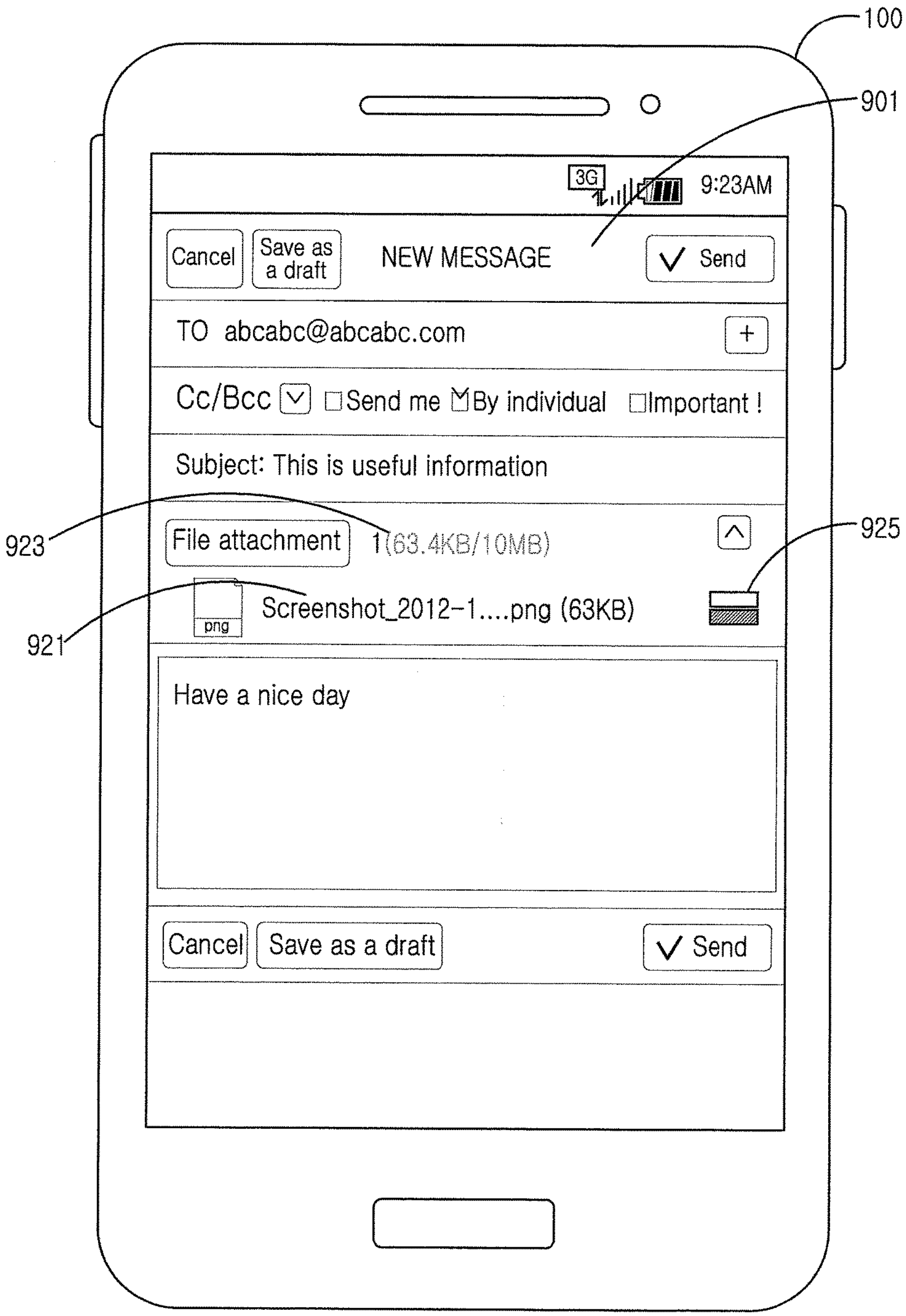
Figure 9C:
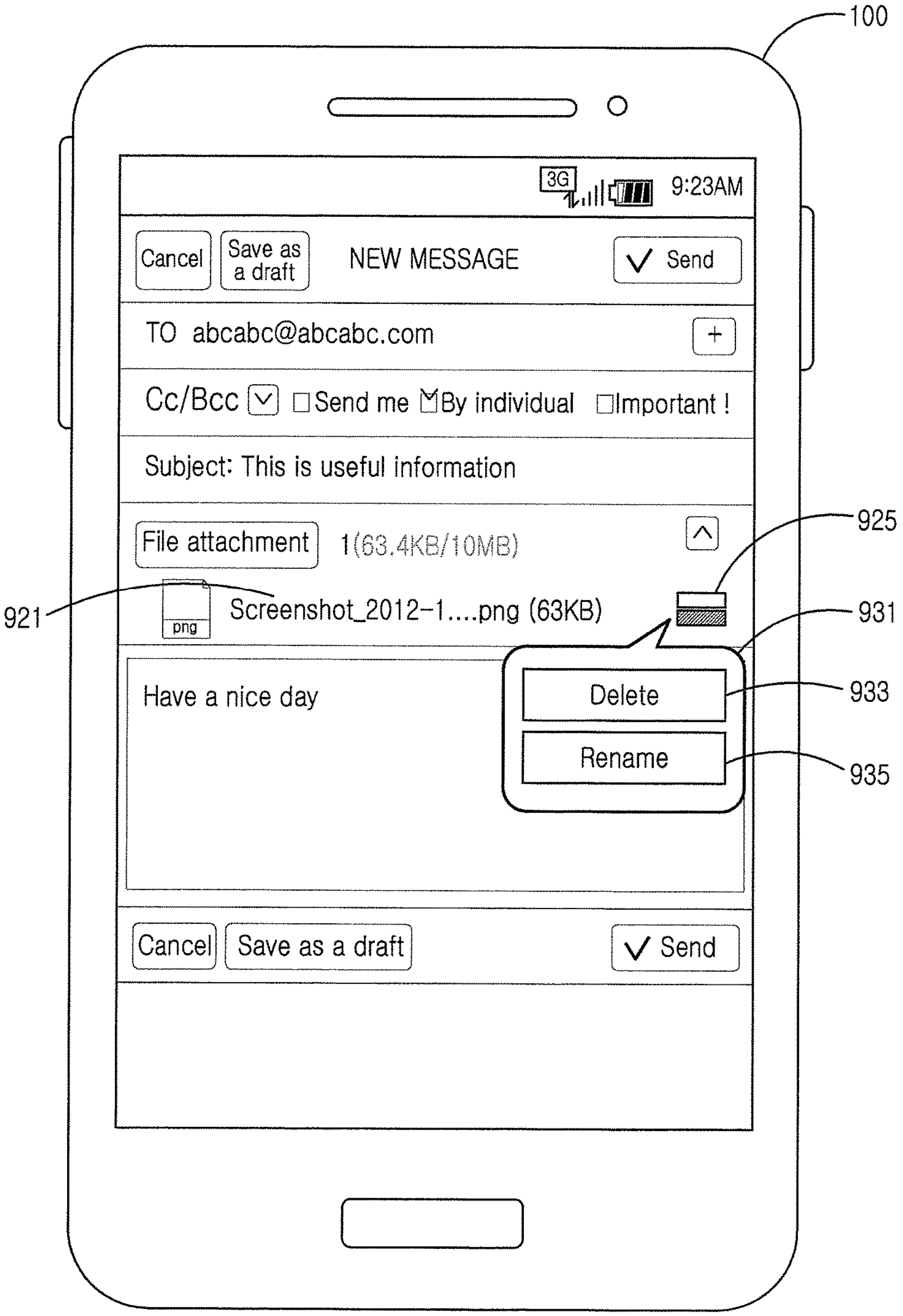
Figure 9D:
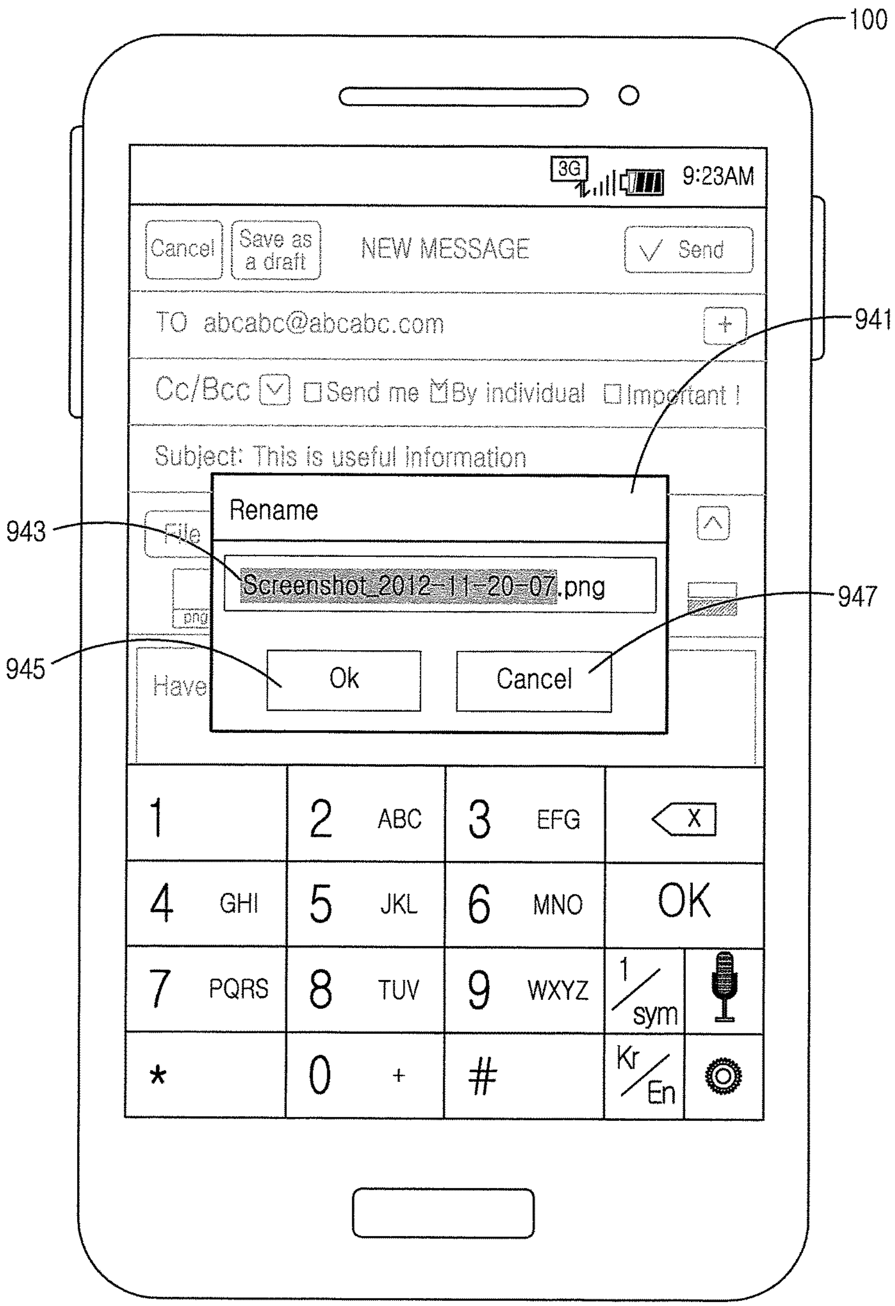
Figure 9E:
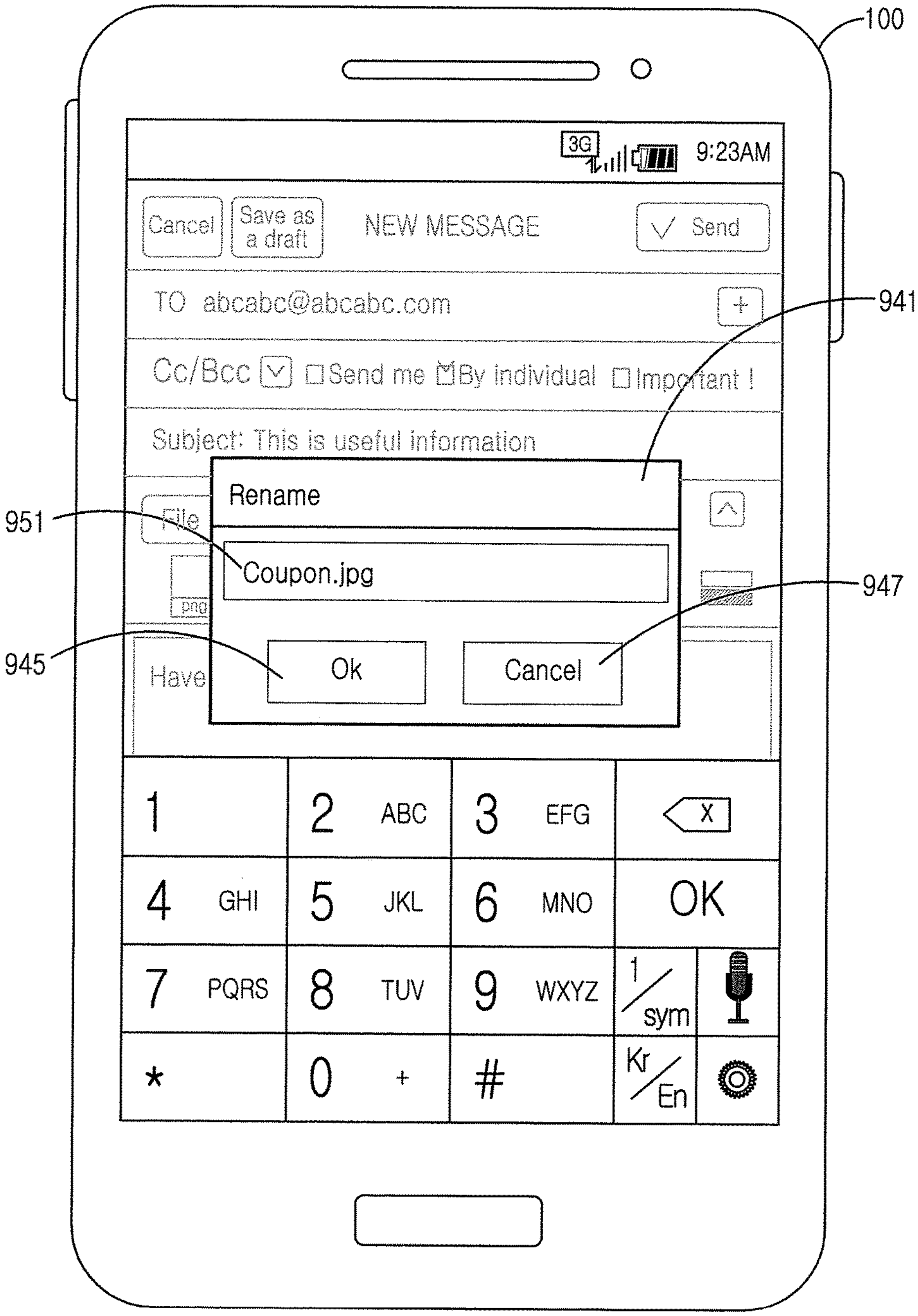
Figure 9F:
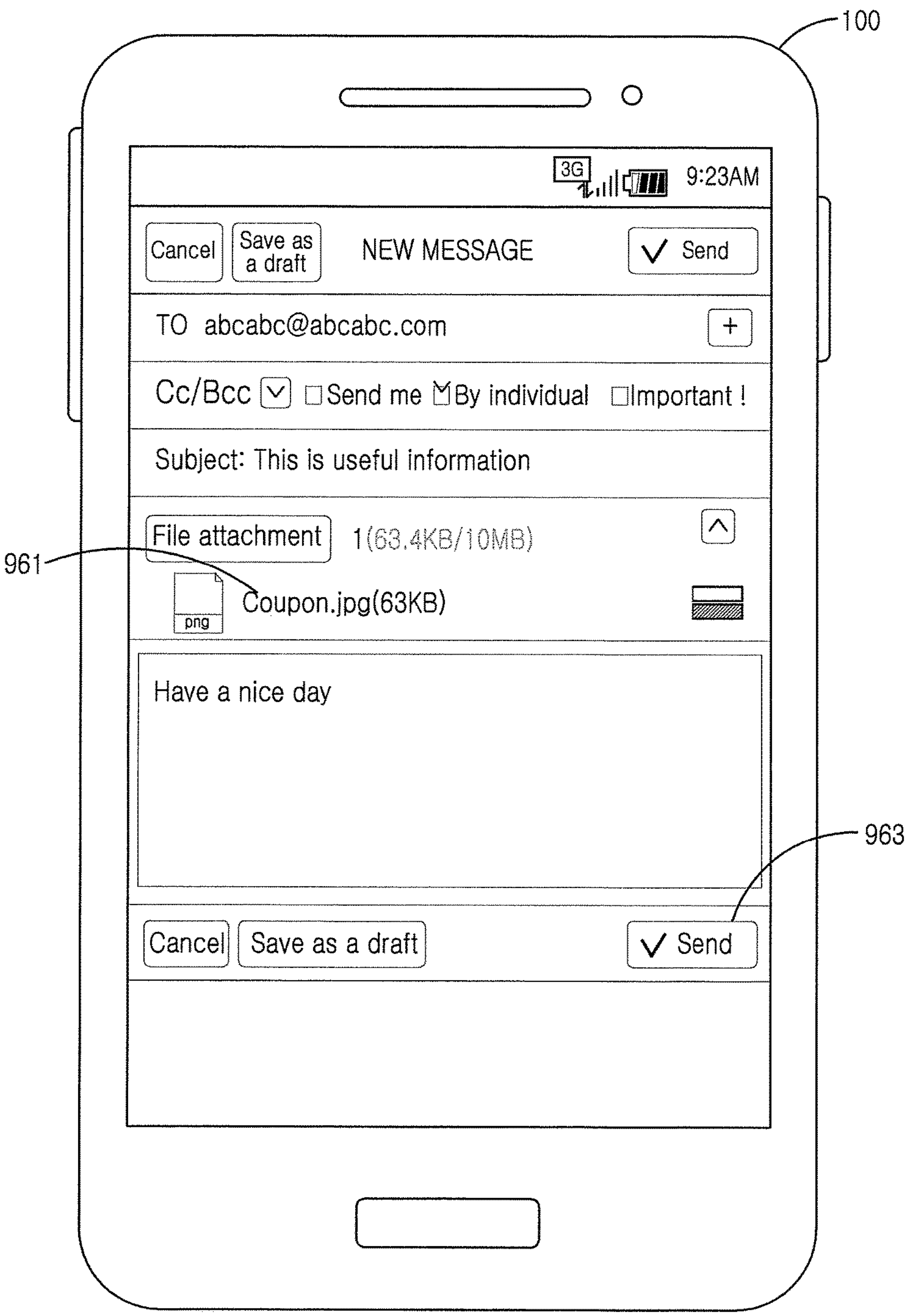

The GUI program 113 may include at least one software component for providing a graphic user interface on a display unit 160. For example, the GUI program 113 may include an instruction for displaying information about application programs executed by the processor 122 on the display unit 160. For example, in a case of attaching a file in an application program, the GUI program 113 may display the name 921 of the attached file on the display unit 160 as illustrated in FIG. 9B. In another example, when an event for renaming an attached file occurs, the GUI program 113 may display an "Rename" window on the display unit 160 as illustrated in FIG. 9B. In another example, when the attached file is renamed, the GUI program 113 may display the changed name 961 of the attached file on the display unit 160 as illustrated in FIG. 9F The file management program 114 may include at least one software component for attaching a file to transmitted data. For example, when a file attachment event occurs in an application program, the file management program 114 performs attachment of at least one file that is stored in the memory 110. In this case, the file management program 114 controls the attached file using a file management table. Herein, the file management table may include an original file information field including the file directory field of an original file, the file format field of the original file and the file name field of the original file, and a changed file information field including the file format field of a changed file and the file name field of the changed file. If a file name is changed, the file management program 114 updates the file information field in the file management table.

The file management program 114 may include at least one software component for generating a header in consideration of the changed name of the file for attachment to data transmission. For example, when a data transmission event occurs, the file management program 114 determines whether the attached file is renamed. In this case, the file management program 114 determines whether the name of the file is changed in consideration of the changed file name field value of the changed file information field in the file management table. When the name of the file is changed, the file management program 114 generates a header for data transmission in consideration of the changed name of the file to be attached to data.

In addition, when the attached file is renamed, the file management program 114 may control the renamed file by setting a flag in the file management table. Furthermore, when there is a plurality of file management tables, the file management program 114 may set a flag for at least one file management table including at least one renamed file.

The application program 115 may include a software component for at least one application program installed in the electronic device 100.

The processor unit 120 may include a memory interface 121, at least one processor 122, and a peripheral interface 124. In this case, the memory interface 121, the at least one processor 122 and the peripheral interface 124 which are included in the processor unit 120 may be integrated into at least one integrated circuit or be implemented as separate components.

The memory interface 121 controls access to the memory 110 of components, such as the processor 122 or the peripheral interface 124.

The peripheral interface 124 controls connections of the input/output peripherals of the electronic device 100 to the processor 122 and the memory interface 121.

The processor 122 enables the electronic device 100 to provide various multimedia services using at least one software program. In this case, the processor 122 executes at least one program stored in the memory 110 and provides a service corresponding to the program.

The audio processing unit 130 provides an audio interface between a user and the electronic device 100 through a speaker 131 and a microphone 132.

The communication system 140 provides a communication function for voice communication and data communication in the electronic device 100. In this case, the communication system 140 may be classified into a plurality of communication sub-modules which support different communication networks. For example, the communication networks may include, but not limited to, a Global System for Mobile communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a wireless LAN, a Bluetooth network, and a Near Field Communication (NFC) network.

The input/output control unit 150 provides an interface between an input/output device, such as the display unit 160 and the input device 170, and the peripheral interface 124.

The display unit 160 displays at least one of the state information of the electronic device 100, characters input by the user, moving pictures, and still pictures. For example, the display unit 160 displays information about application programs executed by the processor 122.

The input device 170 provides input data generated by the selection of the user to the processor unit 120 through the input/output control unit 150. In this case, the input device 170 may include a keypad including at least one hardware button, a touch pad for detecting touch information, and the like. For example, the input device 170 provides touch information detected through the touch pad to the processor 122 through the input/output control unit 150.

Figure 2:
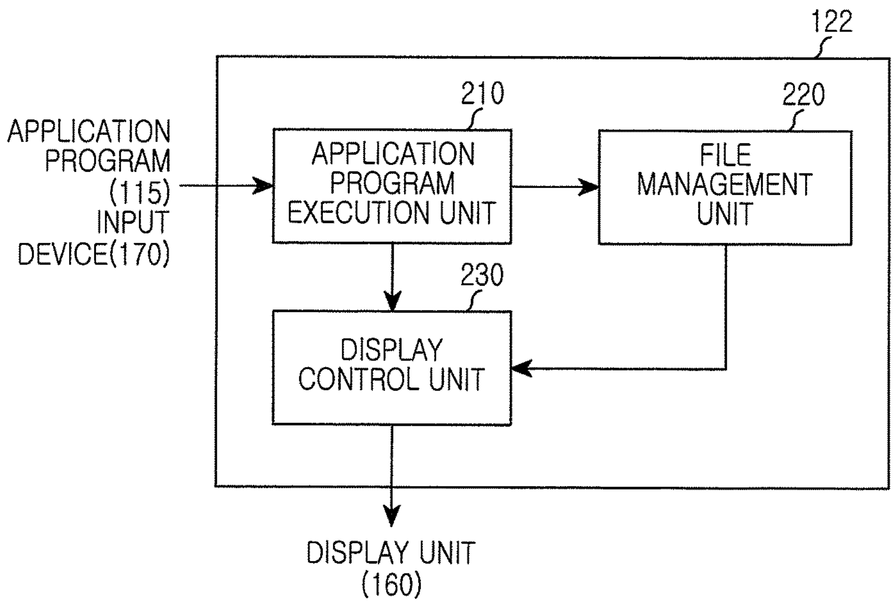
FIG. 2 illustrates a detailed block diagram of a processor according to an embodiment of the present disclosure.

FIG. 2 illustrates a detailed block diagram of a processor according to an exemplary embodiment of the present disclosure.

As illustrated in FIG. 2, the processor 122 may include an application program execution unit 210, a file management unit 220, and a display control unit 230.

The application program execution unit 210 executes any one of at least one applications 115 stored in the program storage unit 111 to provide a service corresponding to a relevant program. For example, the application program execution unit 210 executes an email application program stored in the program storage unit 111 to provide an email service.

The file management unit 220 executes the file management program 114 stored in the program storage unit 111 and attaches a file to data transmission. For example, when a file attachment event occurs in an application program, the file management unit 220 performs attachment of at least one file that is stored in the memory 110. In this case, the file management unit 220 controls the attached file using a file management table. Herein, the file management table may include an original file information field including the file directory field of an original file, the file format field of the original file and the file name field of the original file, and a changed file information field including the file format field of a changed file and the file name field of the changed file. If a file name is changed, the file management unit 220 updates the file information field in the file management table.

In addition, the file management unit 220 generates a header in consideration of the changed name of the file for attachment to data transmission. For example, when a data transmission event occurs, the file management unit 220 determines whether the name of the attached file is changed. In this case, the file management unit 220 determines whether the name of the file is changed in consideration of the changed file name field value of the changed file information field in the file management table. When the name of the file is changed, the file management unit 220 generates a header for data transmission in consideration of the changed name of the file to be attached to data.

In addition, when the attached file is renamed, the file management unit 220 may control the renamed file by setting a flag in the file management table. Furthermore, when there is a plurality of file management tables, the file management unit 220 may set a flag for at least one file management table including at least one renamed file.

The display control unit 230 executes a GUI program 113 stored in the program storage unit 111 and displays a graphic user interface on the display unit 160. For example, the display control unit 230 displays information about an application program that is executed by the application program execution unit 210 on the display unit 160. For example, in a case of attaching a file in an application program, the display control unit 230 may display the name 921 of the attached file on the display unit 160 as illustrated in FIG. 9B. In another example, when an event for renaming an attached file occurs, the display control unit 230 may display an “Rename” window on the display unit 160 as illustrated in FIG. 9B. In another example, when the attached file is renamed, the display control unit 230 may display the changed name 961 of the attached file on the display unit 160 as illustrated in FIG. 9F.

In the above-described embodiment, the electronic device 100 includes the file management unit 220 and manages the attached file using the processor 122.

In another embodiment, the electronic device 100 may include a separate file management module for managing an attached file.

Figure 3:
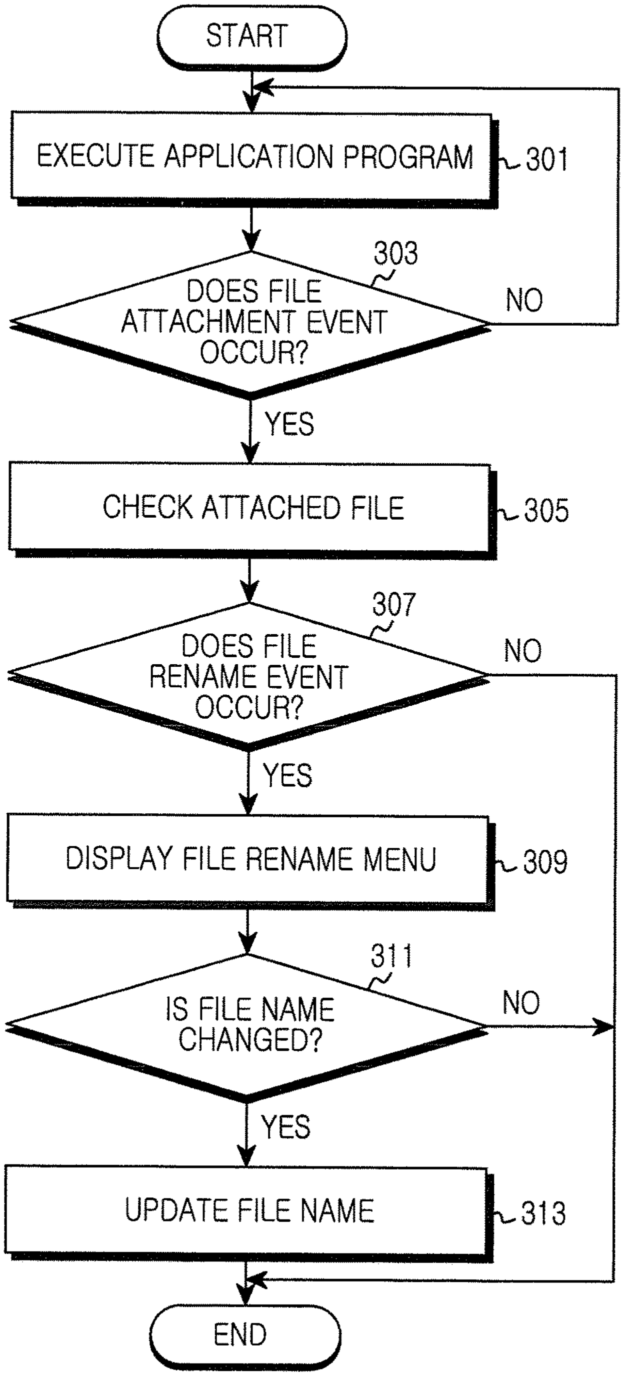
FIG. 3 illustrates a flowchart of a process for renaming an attached file in an electronic device according to an exemplary embodiment of the present disclosure.

FIG. 3 illustrates a process for renaming an attached file in an electronic device according to an exemplary embodiment of the present disclosure.

Referring to FIG. 3, in step 301, the electronic device executes an application program. For example, as illustrated in FIG. 9A, the electronic device 100 executes an email application program 901. Although the above embodiment has been described taking, as an example, the email application program, the application program for description of the present disclosure may include at least one application program capable of transmitting data to which a file is attached.

After execution of the application program, the electronic device determines whether a file attachment event occurs in step 303. For example, as illustrated in FIG. 9A, the electronic device determines whether a selection of a "File attachment" menu 903 is detected by the email application program 901. If the file attachment event does not occur, the electronic devices proceeds to step 301 and maintains the operation state of the application program.

Figure 8A:
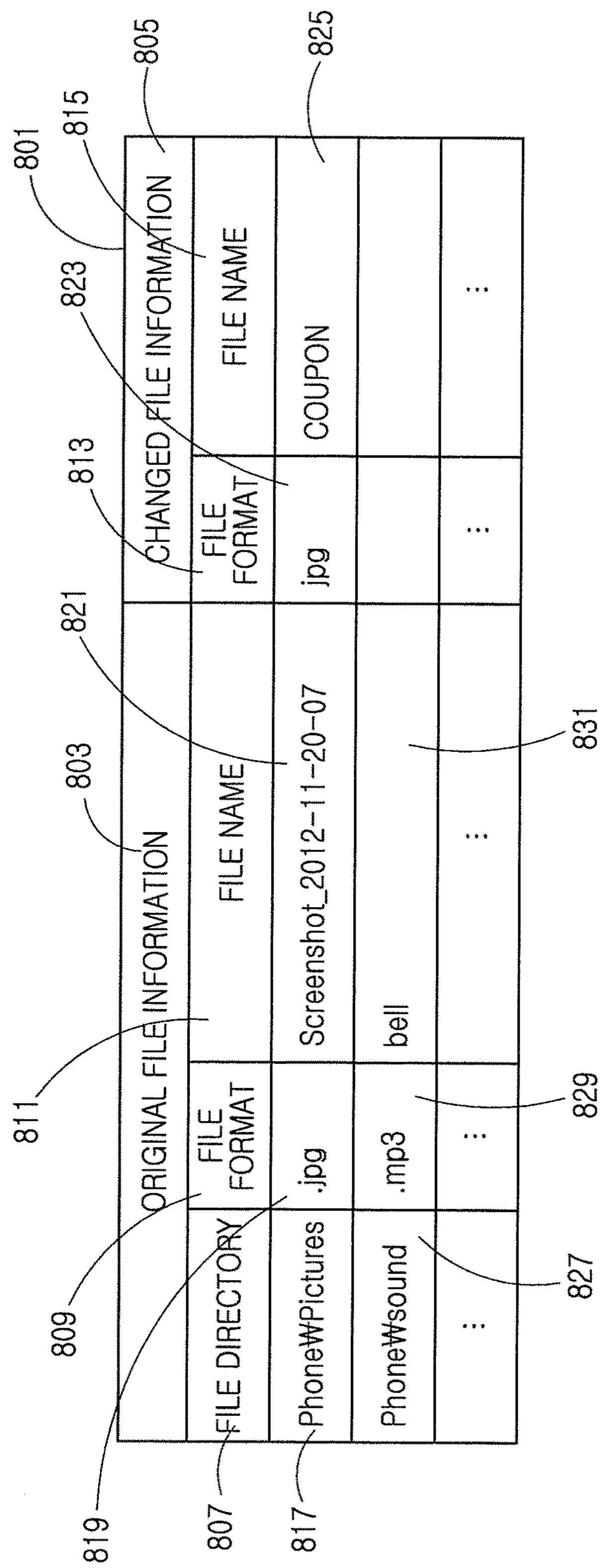

When the file attachment event occurs, the electronic device proceeds to step 305. In step 305, the electronic device checks the attached file. For example, as illustrated in FIG. 9A, when the selection of the "File attachment" menu 903 is detected by the email application program 901, the electronic device performs attachment of at least one file that is stored in the memory. In this case, the electronic device may manage the attached file using the file management table 801 as illustrated in FIG. 8A. Herein, the file management table 801 may include an original file information field 803 including the file directory field 807 of an original file, the file format field 809 of the original file and the file name field 811 of the original file, and a changed file information field 805 including the file format field 813 of a changed file and the file name field 815 of the changed file.

After checking the attached file, the electronic device determines whether a file rename event occurs in step 307. For example, as illustrated in FIG. 9C, the electronic device determines whether an attached file control menu 925 is selected in the email application program 901. Thereafter, the electronic device determines whether a selection of a "Rename" menu 935 is detected in the sub-menu 931 of the attached file control menu 925. When the file rename event does not occur, the electronic device ends the algorithm.

On the other hand, when the file rename event occurs, the electronic device proceeds to step 309. In step 309, the electronic device displays the file rename menu. For example, when the selection of the "Rename" menu 935 is detected in the sub-menu 931 of the attached file control menu 925 as illustrated in FIG. 9C, the electronic device displays a "Rename" window 941 as illustrated in FIG. 9D.

After displaying the file rename menu, the electronic device determines whether the file name is changed in step 311. For example, as illustrated in FIG. 9D, whether the name of an original file, "Screenshot_2012-11-20-07.jpg" 921 displayed on the "Rename" window 941 is changed is determined. When the file name is not changed, the electronic device ends the algorithm.

On the other hand, when the file name is changed, in step 313, the electronic device proceeds to step 313. In step 313, the electronic device updates the file name. For example, as illustrated in FIG. 9D, when "Screenshot_2012-11-20-07.jpg" 921, the name of the original file displayed on the "Rename" window 941 is changed to "coupon.jpg" 951 as illustrated in FIG. 9E and a selection of an "OK" menu 945 is detected, the electronic device displays the changed file name in the email application program 901 as illustrated in FIG. 9F. In addition, when the file name is changed, the electronic device updates the file information of the file management table 801.

Thereafter, the electronic device ends the algorithm.

Figure 4A:
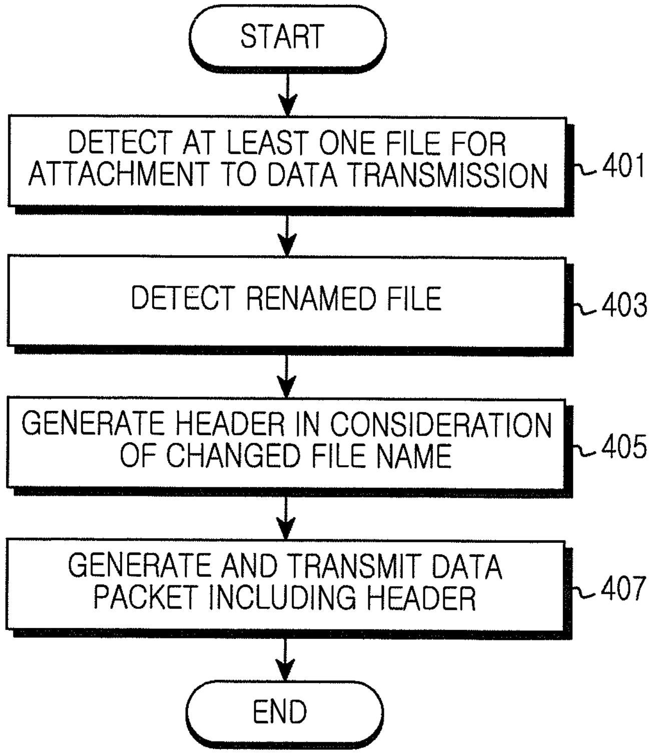
FIG. 4A illustrates a flowchart of a process for generating a header in consideration of the changed name of an attached file in an electronic device according to a first exemplary embodiment of the present disclosure.

FIG. 4A illustrates a process for generating a header in consideration of the changed name of an attached file in an electronic device according to a first exemplary embodiment of the present disclosure.

Referring to FIG. 4A, in step 401, the electronic device detects at least one file for attachment to data transmission when a data transmission event is generated. For example, as illustrated in FIGS. 9A and 9B, the electronic device determines whether there is a file attached through the "File attachment" menu 903 in the email application program 901. In this case, the electronic device may determine whether there is the attached file using the file management table 801 as illustrated in FIG. 8A. Herein, the file management table 801 may include an original file information field 803 including the file directory field 807 of an original file, the file format field 809 of the original file and the file name field 811 of the original file, and a changed file information field 805 including the file format field 813 of a changed file and the file name field 815 of the changed file. In addition, the electronic device displays at least one of the number and size 923 of attached files and the respective names 921 and sizes of the attached files in the email application program 901. In addition, the electronic device may display at least one of a receiver address 905, a subject 907, and contents 909 in the email application program 901.

After detecting the attached file, in step 403, the electronic device detects a renamed file. For example, in step 401, the electronic device determines whether the name of the detected attached file is different from the name of the file at the time of detection of a data transmission request. That is, as illustrated in FIG. 8A, the electronic device may detect the renamed file in consideration of the file format field 809 and name field 811 of the original file, and the file format field 813 and name field 815 of the changed file in the file management table 801.

After detecting the renamed file, the electronic device generates a header in consideration of the changed name of the file in step 405. For example, when "Screenshot_2012-11-20-07.jpg" 921, the name of the file attached in the email application program 901 as illustrated in FIG. 9B is changed to "coupon.jpg" 961 as illustrated in FIG. 9F, the electronic device generates the header for data transmission in consideration of the changed file name, "coupon.jpg" 961. For example, when the application program uses a Multipurpose Internet Mail Extensions (MIME) protocol, the electronic device may include "Content-Type: image/jpeg; name="coupon"" in a MIME header. In another example, when the application program uses a Synchronized Multimedia Integration Language (SMIL) protocol, the electronic device may include "<img src="coupon.jpg">" in a SMIL header. In this case, it is assumed that the name of the file stored actually in the memory 110 is maintained as an original file name, "Screenshot_2012-11-20-07.jpg" 921, although "Screenshot_2012-11-20-07.jpg" 921, the name of the file attached in the email application program 901 as illustrated in FIG. 9B is changed to "coupon.jpg" 961 as illustrated in FIG. 9F.

Figure 10:
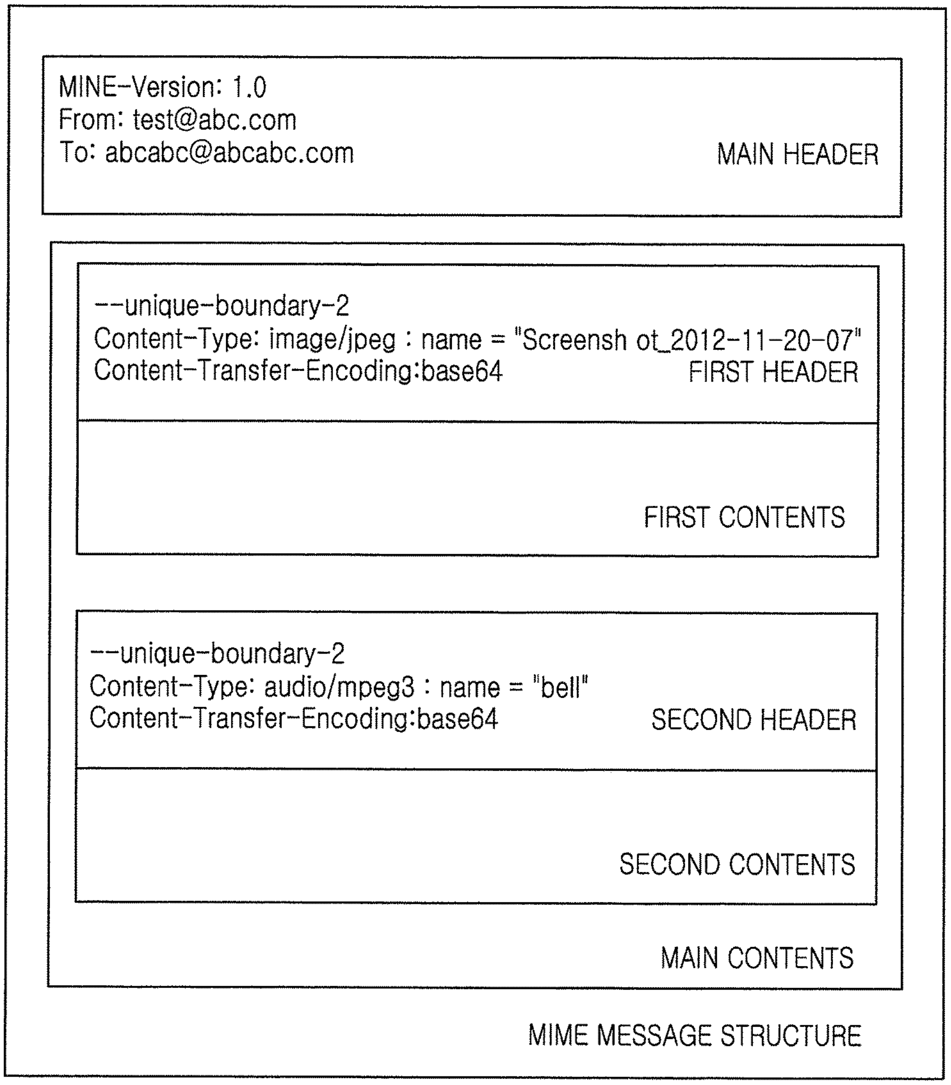
FIG. 10 illustrates a packet configuration for data transmission in an electronic device according to an exemplary embodiment of the present disclosure.

After generating the header, the electronic device generates and transmits a data packet including the header in step 407. For example, when the application program uses the MIME protocol, the electronic device may generate the data packet having the structure of MIME as illustrated in FIG. 10. After generating the data packet as illustrated in FIG. 9F, the electronic device includes the subject 907, contents 909, and the renamed attached file in an email and transmits the email to the receiver address 905 in the email application program.

Thereafter, the electronic device ends the algorithm.

Figure 4B:
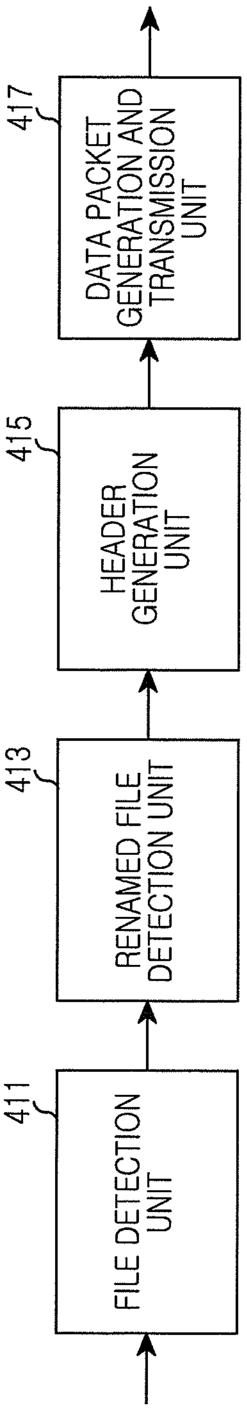
FIG. 4B illustrates a configuration of an electronic device for generating a header in consideration of the changed name of an attached file according to an exemplary embodiment of the present disclosure.

As described above, respective processes for generating a header for data transmission in consideration of the changed name of a file attached to an application program in an electronic device may be implemented by units for generating the header for data transmission in consideration of the changed name of the file attached to the application program as illustrated in FIG. 4B.

FIG. 4B illustrates a configuration of an electronic device for generating a header in consideration of the changed name of an attached file according to an exemplary embodiment of the present disclosure.

Referring to FIG. 4B, the electronic device may include a first unit 411 for detecting at least one file for attachment to data transmission, a second unit 413 for detecting a renamed file, a third unit 415 for generating a header in consideration of the changed name of the file, and a fourth unit 417 for generating and transmitting a data packet including the header.

The first unit 411 detects at least one file for attachment to data transmission. For example, as illustrated in FIGS. 9A and 9B, the electronic device determines whether there is a file attached through the "File attachment" menu 903 in the email application program 901. In this case, the electronic device may determine whether there is the attached file using the file management table 801 as illustrated in FIG. 8A. Herein, the file management table 801 may include the original file information field 803 including the file directory field 807 of an original file, the file format field 809 of the original file and the file name field 811 of the original file, and the changed file information field 805 including the file format field 813 of a changed file and the file name field 815 of the changed file. In addition, the electronic device displays at least one of the number and size 923 of attached files, and the respective names 921 and sizes of the attached files in the email application program 901. In addition, the electronic device may display at least one of a receiver address 905, a subject 907, and contents 909 in the email application program 901.

The second unit 413 detects the renamed file. For example, the electronic device determines whether the name of the attached file detected by the first unit 411 is different from the name of the file at the time of detection of a data transmission request. That is, as illustrated in FIG. 8A, the electronic device may detect the renamed file in consideration of the file format field 809 and file name field 811 of the original file, and the file format field 813 and file name field 815 of the changed file in the file management table 801.

The third unit 415 generates a header in consideration of the changed name of the file. For example, when "Screenshot_2012-11-20-07.jpg" 921, the name of the file attached in the email application program 901 as illustrated in FIG. 9B is changed to "coupon.jpg" 961 as illustrated in FIG. 9F, the electronic device generates the header for data transmission in consideration of the changed file name, "coupon.jpg" 961. For example, when the application program uses a MIME protocol, the electronic device may include "Content-Type: image/jpeg; name="coupon"" in a MIME header. In another example, when the application program uses a SMIL protocol, the electronic device may include "<img src="coupon.jpg">" in a SMIL header. In this case, it is assumed that, although "Screenshot_2012-11-20-07.jpg" 921, the name of the file attached in the email application program 901 as illustrated in FIG. 9B is changed to "coupon.jpg" 961 as illustrated in FIG. 9F, "coupon.jpg" 961, the name of the file actually stored in the memory 110 is maintained as the name of the original file, "Screenshot_2012-11-20-07.jpg" 921.

The fourth unit 417 generates and transmits the data packet including the header. For example, when the application program uses the MIME protocol, the electronic device may generate the data packet having the structure of MIME as illustrated in FIG. 10. After generating the data packet, as illustrated in FIG. 9F, the electronic device includes the subject 907, contents 909, and the renamed attached file 961 in an email and transmits the email to the receiver address 905 in the email application program.

As described above, the electronic device may include the respective units for generating the header for data transmission in consideration of the changed name of the file attached to the application program. In this case, the electronic device may configure one unit integrating the respective units for generating the header for data transmission in consideration of the changed name of the file attached to the application program.

Figure 5:
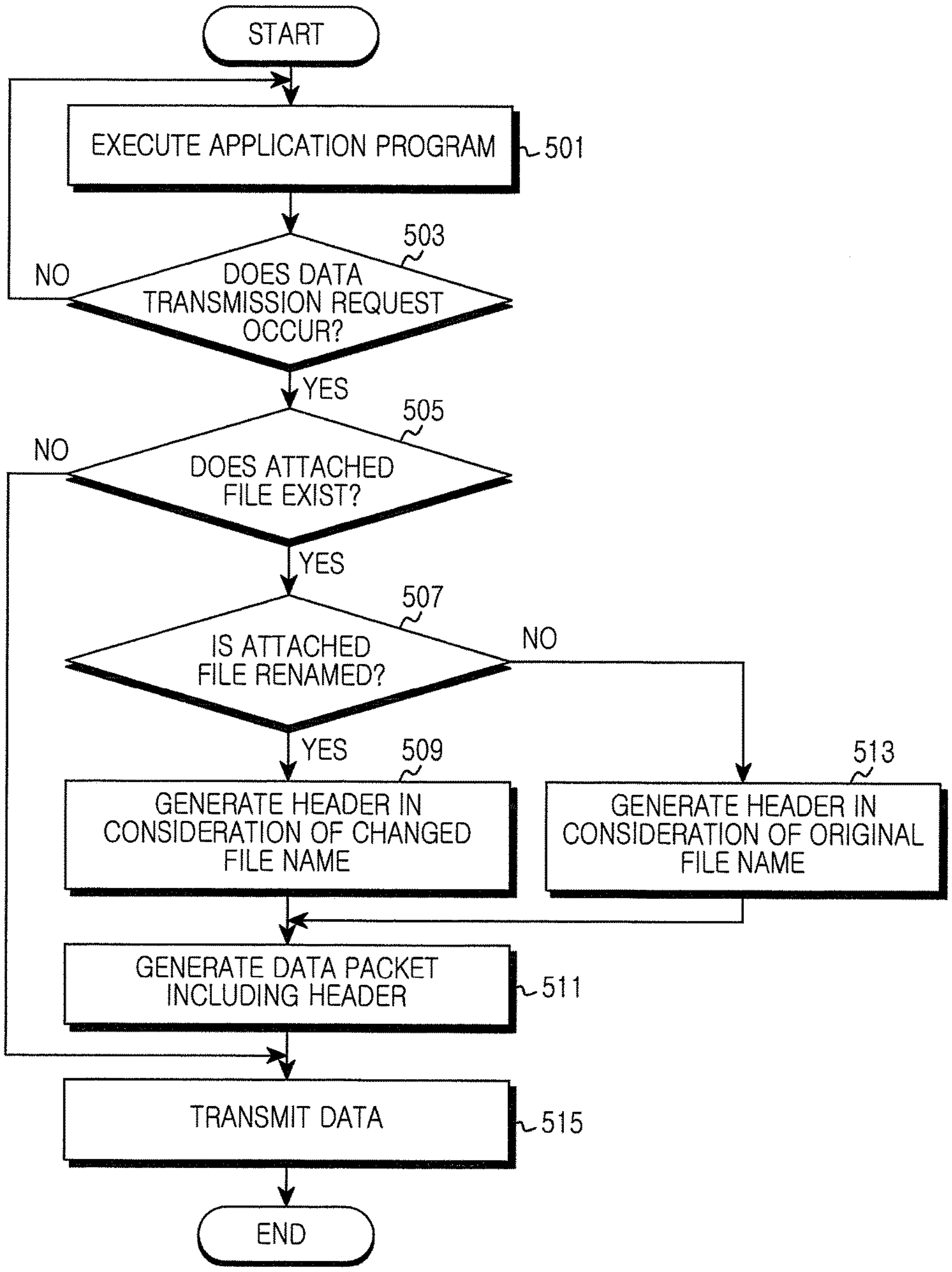
FIG. 5 illustrates a flowchart of a process for generating a header in consideration of the changed name of an attached file in an electronic device according to a second exemplary embodiment of the present disclosure.

FIG. 5 illustrates a process for generating a header in consideration of the changed name of an attached file in an electronic device according to a second exemplary embodiment of the present disclosure.

Referring to FIG. 5, in step 501, the electronic device executes an application. For example, as illustrated in FIG. 9A, the electronic device 100 executes an email application program 901. Although the above embodiment has been described taking, as an example, the email application program, the application program for description of the present disclosure may include at least one application program capable of transmitting data to which a file is attached.

After execution of the application program, the electronic device detects whether there is a data transmission request in step 503. For example, as illustrated in FIGS. 9A to 9C and FIG. 9F, the electronic device determines whether an input for a "Send" menu 963 is detected in the email application program. In addition, the "Send" menu 963 may include a menu for transmitting data including at least one of the subject 907 and the contents 909 to the receiver address 905 of the email application program 901. If the data transmission request is not detected, the electronic devices proceeds to step 501 and continuously displays the screen of the email application program.

On the other hand, when the data transmission request is detected in step 503, the electronic device proceeds to step 505. In step 505, the electronic device determines whether there is an attached file included in data transmission. For example, as illustrated in FIGS. 9A and 9B, the electronic device determines whether there is the file attached through the "File attachment" menu 903 in the email application program 901. In this case, the electronic device may determine whether there is the attached file using the file management table 801 as illustrated in FIG. 8A. Herein, the file management table 801 may include an original file information field 803 including the file directory field 807 of an original file, the file format field 809 of the original file and the file name field 811 of the original file, and a changed file information field 805 including the file format field 813 of a changed file and the file name field 815 of the changed file. In addition, the electronic device the electronic device displays at least one of the number and size 923 of attached files, and the respective names 921 and sizes of the attached files in the email application program 901. In addition, the electronic device may display at least one of the receiver address 905, the subject 907, and contents 909 in the email application program 901. When the attached file does not exist (in step 505), the electronic device transmits data in step 515.

On the other hand, when the attached file exists (in step 505), the electronic device proceeds to step 507. In step 507, the electronic device detects whether the attached file detected in step 505 is renamed. For example, in step 505, the electronic device determines whether the name of the attached file detected in step 505 is different from the name of the file at the time of detection of the data transmission request. That is, as illustrated in FIG. 8A, the electronic device may detect whether the name of the attached file is changed in consideration of the file format field 809 and file name field 811 of the original file, and the file format field 813 and file name field 815 of the changed file in the file management table 801. When the file name is not changed in step 507, the electronic device proceeds to step 513. In step 513, the electronic device generates a header in consideration of the original file name.

On the other hand, when the file name is changed (in step 507), the electronic device proceeds to step 509. In step 509, the electronic device generates a header for data transmission in consideration of the changed file name. For example, when "Screenshot_2012-11-20-07.jpg" 921, the name of the file attached in the email application program 901 as illustrated in FIG. 9B is changed to "coupon.jpg" 961 as illustrated in FIG. 9F, the electronic device generates the header for data transmission in consideration of the changed file name, "coupon.jpg" 961. For example, when the application program uses a MIME protocol, the electronic device may include "Content-Type: image/jpeg; name="coupon"" in a MIME header. In another example, when the application program uses a SMIL protocol, the electronic device may include "<img src="coupon.jpg">" in a SMIL header. In this case, it is assumed that the name of the file stored actually in the memory 110 is maintained as the name of the original file, "Screenshot_2012-11-20-07.jpg" 921 although "Screenshot_2012-11-20-07.jpg" 921, the name of the file attached in the email application program 901 as illustrated in FIG. 9B is changed to "coupon.jpg" 961 as illustrated in FIG. 9F, "coupon.jpg" 961.

After generating the header in consideration of the changed file name in step 509, the electronic device generates a data packet including the header generated in step 509, in step 511. For example, when the application program uses the MIME protocol, the electronic device may generate the data packet having the structure of MIME as illustrated in FIG. 10.

After generating the data packet including the header in step 511, the electronic device transmits the generated data packet in step 515. For example, as illustrated in FIG. 9F, the electronic device includes the subject 907, the contents 909, and the renamed attached file 961 in an email and transmits the email to the receiver address 905 in the email application program.

On the other hand, when the file name is not changed in step 507, the electronic device generates the header in consideration of the original file name in step 513. If the file name is not changed at the time of request of file transmission from "Screenshot_2012-11-20-07.jpg" 921, the original name of the file attached in the email application program 901 as illustrated in FIG. 9B, the electronic device generates the header for data transmission in consideration of the original file name, "Screenshot_2012-11-20-07.jpg" 921. For example, when the application program uses a MIME protocol, the electronic device may include "Content-Type: image/jpeg; name="Screenshot_2012-11-20-07"" in a MIME header. In another example, when the application program uses a SMIL protocol, the electronic device may include "<img src="Screenshot_2012-11-20-07.jpg">" in a SMIL header.

After generating the header in consideration of the original file name in step 513, the electronic device generates a data packet including the header generated in step 513, in step 511. For example, when the application program uses the MIME protocol, the electronic device may generate the data packet having the structure of MIME as illustrated in FIG. 10.

Thereafter, the electronic device ends the algorithm.

Figure 6:
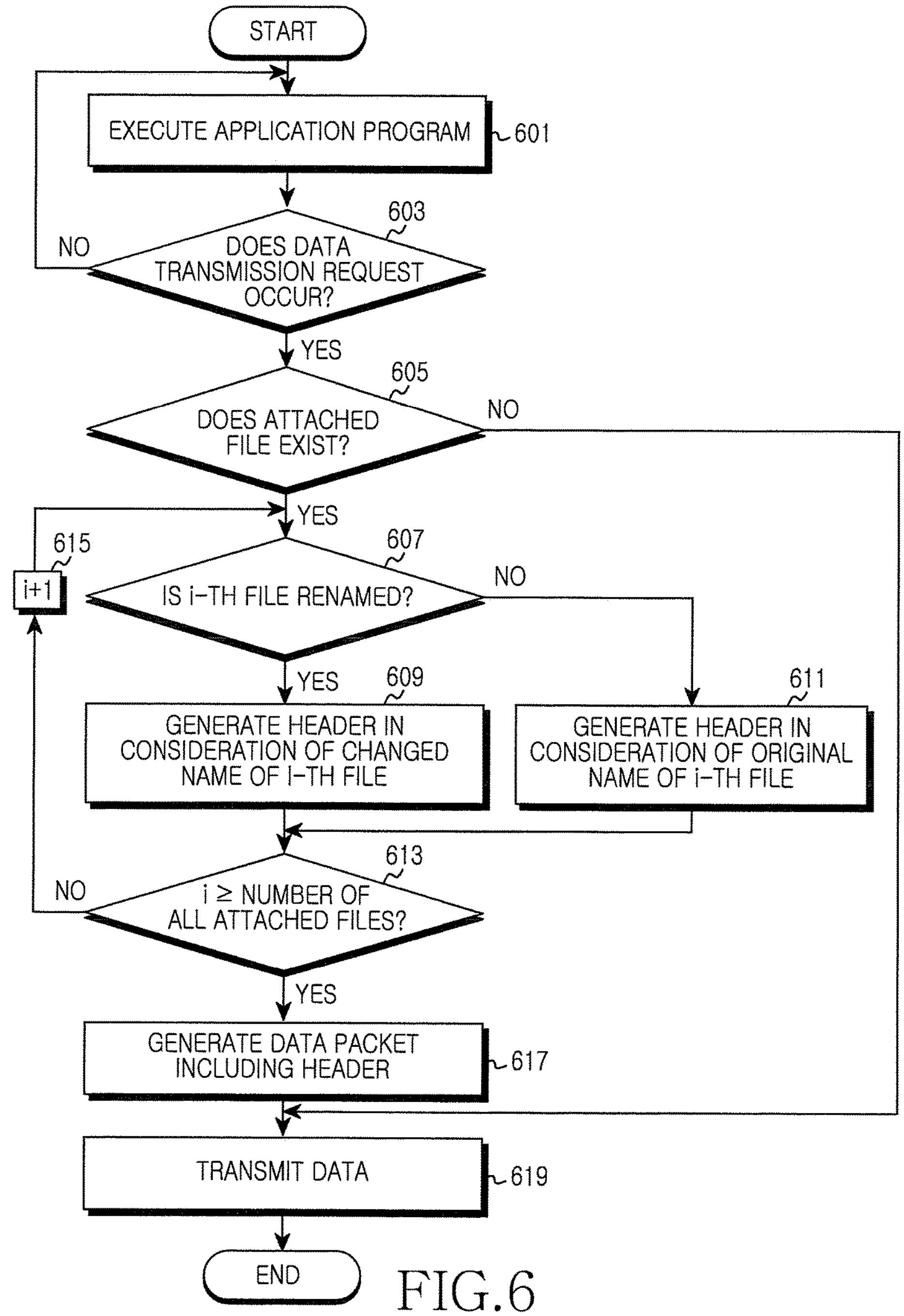
FIG. 6 illustrates a flowchart of a process for generating a header in consideration of the changed name of an attached file in an electronic device according to a third exemplary embodiment of the present disclosure.

FIG. 6 illustrates a process for generating a header in consideration of the changed name of an attached file in an electronic device according to a third exemplary embodiment of the present disclosure.

Referring to FIG. 6, in step 601, the electronic device executes an application program. For example, as illustrated in FIG. 9A, the electronic device 100 executes an email application program 901. Although the above embodiment has been described taking, as an example, the email application program, the application program for description of the present disclosure may include at least one application program capable of transmitting data to which a file is attached.

After execution of the application program, the electronic device detects whether there is a data transmission request in step 603. For example, as illustrated in FIGS. 9A to 9C and FIG. 9F, the electronic device determines whether an input for a "Send" menu 963 is detected in the email application program. In addition, the "Send" menu 963 may include a menu for transmitting data including at least one of the subject 907 and the contents 909 to the receiver address 905 of the email application program 901. If the data transmission request is not detected, the electronic devices proceeds to step 601 and continuously displays the screen of the email application program.

On the other hand, when the data transmission request is detected in step 603, the electronic device determines whether there is an attached file included in data transmission in step 605. For example, as illustrated in FIGS. 9A and 9B, the electronic device determines whether there is the file attached through the "File attachment" menu 903 in the email application program 901. In this case, the electronic device may determine whether there is the attached file using the file management table 801 as illustrated in FIG. 8A. Herein, the file management table 801 may include the original file information field 803 including the file directory field 807 of an original file, the file format field 809 of the original file, and the file name field 811 of the original file, and the changed file information field 805 including the file format field 813 of a changed file, and the file name field 815 of the changed file. In addition, the electronic device the electronic device displays at least one of the number and size 923 of attached files, and the respective names 921 and sizes of the attached files in the email application program 901. In addition, the electronic device may display at least one of the receiver address 905, the subject 907, and the contents 909 in the email application program 901. If the attached file does not exist, the electronic device proceeds to step 619. In step 619, the electronic device transmits data.

On the other hand, when the attached file exists (in step 605), the electronic device proceeds to step 607. In step 607, the electronic device detects whether the name of an i-th file is changed. Herein, the i is an index number of the attached file, and the initial value thereof is assumed to be 1. For example, if the i is 1, the electronic device determines whether data exist in the file name field 825 of the changed file information field 805 of the first file in the file management table 801 as illustrated in FIG. 8A.

When the i-th file's name is changed (in step 607), the electronic device proceeds to step 609. In step 609, the electronic device generates a header for data transmission in consideration of the changed name of the i-th file. For example, when data exist in the changed file information field 805 in the first file of the file management table 801 as illustrated in FIG. 8A, the electronic device determines that the name of the first file is changed. Therefore, the electronic device generates the header for data transmission in consideration of the contents of the original file and the changed name 825 and the file format 823 in the file directory 817 of the first file. For example, when the application program uses a MIME protocol, the electronic device may include "Content-Type: image/jpeg; name="coupon"" in a MIME header. In another example, when the application program uses a SMIL protocol, the electronic device may include "<img src="coupon.jpg">" in a SMIL header. In this case, it is assumed that the name of the file actually stored in the memory 110 is maintained as the name of the original file, "Screenshot_2012-11-20-07.jpg" 921 although the name of the attached file is changed from "Screenshot_2012-11-20-07.jpg" 921 as illustrated in FIG. 9A to "coupon.jpg" 961 as illustrated in FIG. 9F.

On the other hand, when the i-th file's name is not changed (in step 607), the electronic device proceeds to step 611. In step 611, the electronic device generates a header for data transmission in consideration of the original name of the i-th file. For example, if data do not exist in the changed file information field 805 of a second file in the file management table 801 as illustrated in FIG. 8A, the electronic device determines that the name of the second file is not changed. Therefore, the electronic device generates the header for data transmission in consideration of the contents of the original file, and the file name 829 and file format 831 of the second file in the file directory 827. For example, when the application program uses a MIME protocol, the electronic device may include "Content-Type: audio/mpeg3; name="bell"" in a MIME header. In another example, when the application program uses a SMIL protocol, the electronic device may include "<audio src="bell.mp3">" in a SMIL header. In this case, it is assumed that the name of the original file stored in the memory 110 is not changed actually although the file name is changed from "Screenshot_2012-11-20-07" 821 to "coupon" 825 as illustrated in FIG. 8A.

After generating the header in consideration of at least one of the changed name of the i-th file and the original name of the i-th file in step 609 and step 611, the electronic device determines whether the i is greater than or equal to the number of all attached files in step 613.

When the i is smaller than the number of all attached files (in step 613), the electronic device proceeds to step 615. In step 615, the electronic device increases i by 1 and proceeds to step 607. In step 607, the electronic device determines whether an (i+1)-th file is renamed. For example, as illustrated in FIG. 8A, when the number of all attached files is 2, and the header is generated in consideration of the changed name of the first file, the electronic device increases i by 1 in step 615 and proceeds to step 607. In step 607, the electronic device determines whether the second file is renamed.

On the other hand, when the i is greater than or equal to the number of all attached file in step 613, the electronic device proceeds to step 617. In step 617, the electronic device generates a data packet including the header generated in at least one step of step 609 and step 611. For example, when the application program uses the MIME protocol, the electronic device may generate the data packet having the structure of MIME as illustrated in FIG. 10.

After generating the data packet including the header in step 617, the electronic device transmits the generated data packet in step 619. For example, as illustrated in FIG. 9F, the electronic device includes the subject 907, the contents 909, and the renamed attached file in an email and transmits the email to the receiver address 905 in the email application program.

Thereafter, the electronic device ends the algorithm.

In the above embodiment, the electronic device determines whether respective attached files are renamed respectively.

In another embodiment, the electronic device may determine whether the attached file is renamed using a flag 743 in the file management table as illustrated in FIG. 8B. In the case of transmitting a file, the electronic device may generate a header using the changed file name with respect to a file of which the flag value is set to "1" 845, and generate the header using the original name with respect to a file of which the flag value is set to "0" 847.

Figure 7:
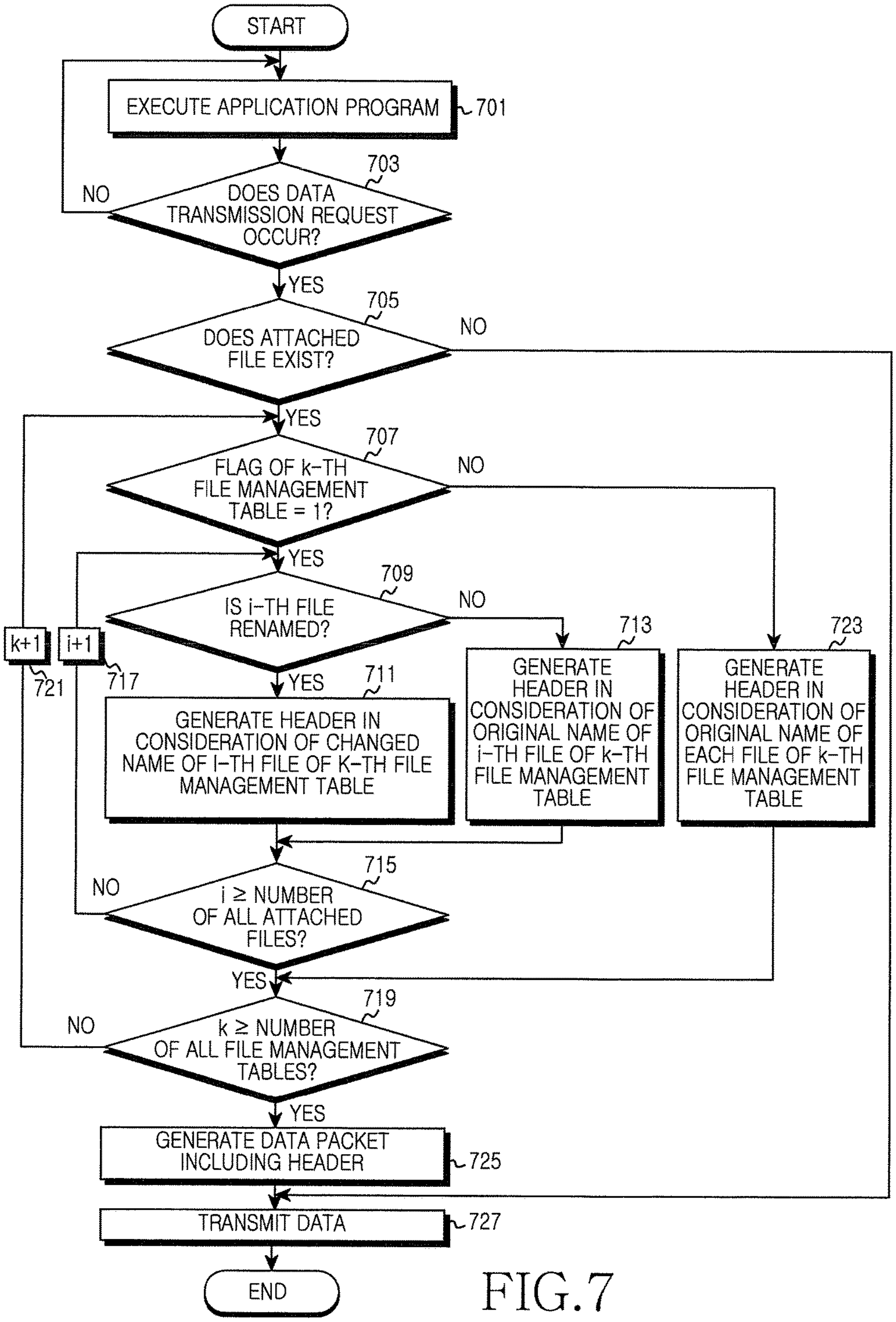
FIG. 7 illustrate a flowchart of a process for generating a header in consideration of the changed name of an attached file in an electronic device according to a fourth exemplary embodiment of the present disclosure.

FIG. 7 illustrates a process for generating a header in consideration of the changed name of an attached file in an electronic device according to a fourth exemplary embodiment of the present disclosure.

Referring to FIG. 7, in step 701, the electronic device executes an application program. For example, as illustrated in FIG. 9A, the electronic device 100 executes an email application program 901. Although the above embodiment has been described taking, as an example, the email application program, the application program for description of the present disclosure may include at least one application program capable of transmitting data to which a file is attached.

After execution of the application program, the electronic device detects whether there is a data transmission request in step 703. For example, as illustrated in FIGS. 9A to 9C and FIG. 9F, the electronic device determines whether an input for a "Send" menu 963 is detected in the email application program. In addition, the "Send" menu 963 may include a menu for transmitting data including at least one of the subject 907 and the contents 909 to the receiver address 905 of the email application program 901. If the data transmission request is not detected, the electronic devices proceeds to step 701 and continuously displays the screen of the email application program.

On the other hand, when the data transmission request is detected (in step 703), the electronic device proceeds to step 705. In step 705, the electronic device determines whether there is an attached file included in data transmission. For example, as illustrated in FIGS. 9A and 9B, the electronic device determines whether there is the file attached through the "File attachment" menu 903 in the email application program 901. In this case, the electronic device may determine whether there is the attached file using the file management table 801 as illustrated in FIG. 8A. Herein, the file management table 801 may include the original file information field 803 including the file directory field 807 of an original file, the file format field 809 of the original file and the file name field 811 of the original file, and a changed file information field 805 including the file format field 813 of a changed file and the file name field 815 of the changed file. In addition, the electronic device may include k tables as illustrated in FIG. 8C. The electronic device displays at least one of the number and size 923 of attached files and the respective names 921 and sizes of the attached files. In addition, the electronic device may display at least one of the receiver address 905, the subject 907, and the contents 909 in the email application program 901. If the attached file does not exist (in step 705), the electronic device transmits data in step 727.

On the other hand, when the attached file exists (in step 705), the electronic device proceeds to step 707. In step 707, the electronic device determines whether the flag of a k-th file management table is 1. Herein, the flag is an identifier for representing that a file management table includes at least one renamed file. For example, when the flag 853 of a first table 851 is "1" 855 as illustrated in FIG. 8C, the electronic device determines that at least one renamed file exists in the first table 851. In another example, when the flag 863 of the second table 861 is "0" 865, the electronic device may determine that a renamed file does not exist in the second table 861.

When the flag of the k-th file management table is 1 in step 707, the electronic device proceeds to step 709. In step 709, the electronic device determines whether the i-th file of the k-th file management table is renamed. Herein, the i is an index number of attached files, and the initial value thereof is assumed to be 1. For example, if the i is 1, the electronic device determines whether data exist in the file name field of the changed file information of a first file in a first file management table 851 as illustrated in FIG. 8C.

When the i-th file is renamed in the k-th file management table (in step 709), the electronic device proceeds to step 711. In step 711, the electronic device generates a header for data transmission in consideration of the changed name of the i-th file of the k-th file management table. For example, if data exist in the changed file information field of the first file in the file management table 851 as illustrated in FIG. 8C, the electronic device determines that the first file is renamed. Therefore, the electronic device generates the header for data transmission in consideration of the contents of an original file, and the changed file name and file format of the first file in the file directory of the first file management table. For example, when the application program uses a MIME protocol, the electronic device may include "Content-Type: image/jpeg; name="coupon"" in a MIME header. In another example, when the application program uses a SAM protocol, the electronic device may include "<img src="coupon.jpg">" in a SMIL header. In this case, it is assumed that the name of the file stored in the memory 110 is not changed although the file name is changed from "Screenshot_2012-11-20-07" to "coupon" as illustrated in FIG. 8C.

When the i-th file is not renamed in the k-th file management table (in step 709), the electronic device proceeds to step 713. In step 713, the electronic device generates a header for data transmission in consideration of the original name of the i-th file of the k-th file management table. For example, when data do not exist in the changed file information field of the second file in the file management table 851 as illustrated in FIG. 8C, the electronic device determines that the name of the second file is not changed. Therefore, the electronic device generates the header for data transmission in consideration of the contents of the original file and the file name and file format of the second file in the file directory. For example, when the application program uses a MIME protocol, the electronic device may include "Content-Type: audio/mpeg3; name="bell"" in a MIME header. In another example, when the application program uses a SMIL protocol, the electronic device may include "<audio src="bell.mp3">" in a SMIL header.

After generating the header in consideration of at least one of the changed name of the i-th file and the original name of the i-th file in the k-the file management table in step 711 and step 713, the electronic device determines whether i is greater than or equal to the number of all attached files of the k-th file management table in step 715.

When the i is smaller than the number of all attached files of the k-th file management table (in step 715), the electronic device increases i by 1 in step 717 and proceeds to step 709. In step 709, the electronic device determines whether an (i+1)-th file is renamed. For example, as illustrated in FIG. 8C, when the number of all attached files of the first file management table is 2, and the header is generated in consideration of the changed name of the first file, the electronic device increases i by 1 in step 717 and proceeds to step 709. In step 709, the electronic device determines whether the second file is renamed.

On the other hand, when the i is greater than or equal to the number of all attached files in the k-th file management table (in step 715), the electronic device determines whether k is greater than or equal to the number of all file management tables in step 719.

When the k is smaller than the number of all file management tables (in step 719), the electronic device increases k by 1 in step 721 and proceeds to step 709. In step 709, the electronic device determines whether the flag of a (k+1)-th file management table is 1. For example, when the number of all file management tables is 3, and the flag of the first file management table exists, the electronic device increases k by 1 in step 721 and proceeds to step 707. In step 707, the electronic device determines whether the flag of the second file management table is 1.

When the flag of the k-th file management table is 0 (in step 707), the electronic device generates the header in consideration of original names of files in the k-th file management table in step 723. For example, when the flag 863 of the second file management table 861 is "0" 865 as illustrated in FIG. 8C, the electronic device determines that there is no renamed file in the second management table 861. Therefore, the electronic device generates the header for data transmission in consideration of the contents of the original file, the file name, and the file format in the at least one file directory included in the second file management table 861. For example, when the application program uses a MIME protocol, the electronic device may include "Content-Type: video/avi; name="20121225"" in a MIME header. In another example, when the application program uses a SMIL protocol, the electronic device may include "<audio src="Alphabet song.mp3">" in a SMIL header.

After generating the header in consideration of the original names of files in the k-th file management table in step 723, the electronic device compares k with the number of all file management tables in step 719.

On the other hand, when the k is greater than or equal to the number of all file management tables (in step 719), the electronic device proceeds to step 725. In step 725, the electronic device generates a data packet including the header generated in at least one step of step 711, step 713 and step 723. For example, when the application program uses a MIME protocol, the electronic device may generate the data packet having the structure of MIME as illustrated in FIG. 10.

After generating the data packet including the header in step 725, the electronic device transmits the generated data packet in step 727. For example, as illustrated in FIG. 9F, the electronic device includes the subject 907, the contents 909, and the renamed attached file 961 in an email and transmits the email to the receiver address 905 in the email application program.

Thereafter, the electronic device ends the algorithm.

As described above, the electronic device maintains the original name of an attached file and generates a header for data transmission in consideration of the changed name of the attached file, thereby enabling a user to easily change the name of the attached file.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method in an electronic device, comprising:

displaying names of one or more files that have been attached to a message in a user interface of a message application;

displaying a changed name of at least one file in the user interface, by changing a name of the at least one file according to a user input in a state in which the names of the one or more files that have been attached to the message are displayed in the user interface, the at least one file being included in the one or more files;

in response to detecting an event for transmitting the message, identifying the at least one file with the changed name;

generating a Multipurpose Internet Mail Extensions (MIME) message header including information on the changed name of the at least one file;

when at least one file of the one or more files is attached, storing file information associated with the at least one attached file in a file management table;

determining whether the name of the at least one file is changed;

in response to determining that the name of the at least one file is changed, storing the file information associated with the at least one file with the changed name in the file management table; and transmitting the message including the header, wherein the file management table includes at least one of: a storage directory field of the one or more files, an original name field, an original filename extension field, a changed name field, a changed filename extension field, or at least one flag.

2. The method of claim 1, wherein the message application includes at least one of an email application, a multimedia message application, or a messenger application.

3. The method of claim 1, further comprising detecting the one or more files that have been attached to the message according to the file information included in the file management table.

4. The method of claim 1, wherein determining whether the name of the at least one file is changed comprises determining whether the name of the at least one file is changed by comparing an original name field value with a changed name field value of the file information associated with the at least one file with the changed name in the file management table.

5. The method of claim 1, wherein determining whether the name of the at least one file is changed comprises determining whether the name of the at least one file is changed according to flag field values of respective files included in the file management table.

6. The method of claim 1, wherein determining whether the name of the at least one file is changed comprises:

in response to identifying that a plurality of file management tables exists, detecting at least one file management table including the at least one file with the changed name according to first flag field values included in the respective file management tables; and determining whether the name of the at least one file is changed according to an original name field value and a changed name field value of a file stored in the at least one file management table including the at least one file with the changed name.

7. The method of claim 1, wherein determining whether the name of the at least one file is changed comprises:

in response to identifying that a plurality of file management tables exists, detecting at least one file management table including the at least one file with the changed name according to second flag field values included in the respective file management tables; and determining whether the name of the at least one file is changed according to the second flag field values of respective files stored in the at least one file management table including the at least one file with the changed name.

8. The method of claim 1, further comprising:

in response to identifying that a file name changed, maintaining an original name of the at least one file stored in a memory in response to identifying that the name of the at least one file changed.

9. The method of claim 1, further comprising:

generating a header according to original names of at least one file of which a name is not changed; and transmitting the message including the header associated with the at least one file of which the name is not changed.

10. The method of claim 1, further comprising:

generating the header associated with the at least one file with the changed name and the header associated with the at least one file of which a name is not changed; and transmitting a data packet including the header associated with the at least one file with the changed name and the header associated with the at least one file of which the name is not changed.

11. An electronic device comprising:

at least one memory comprising at least one program including program code;

a communication interface;

a display; and at least one processor configured to execute the program code to:

control to display names of one or more files that have been attached to a message in a user interface for a message application using the display;

control to display a changed name of at least one file in the user interface, by changing a name of the at least one file according to a user input in a state in which the names of the one or more files that have been attached to the message are displayed in the user interface using the display, the at least one file being included in the one or more files;

in response to detecting an event for transmitting the message, identify the at least one file with the changed name;

generate a Multipurpose Internet Mail Extensions (MIME) message header including information on the changed name of the at least one file;

store, when at least one file of the one or more file is attached, file information associated with the at least one attached file in a file management table;

determine whether the name of the at least one file is changed; and store, in response to determining that the name of the at least one file is changed, the file information associated with the at least one file with the changed name in the file management table, and transmit the message including the header using the communication interface, wherein the file management table includes at least one of: a storage directory field of the one or more attached files, an original name field, an original filename extension field, a changed name field, a changed filename extension field, or at least one flag.

12. The electronic device of claim 11, wherein the message application includes an at least one of an email application, a multimedia message application, or a messenger application.

13. The electronic device of claim 11, wherein the processor is further configured to execute the program code to detect the one or more files that have been attached to the message according to the file information included in the file management table.

14. The electronic device of claim 11, wherein the processor is further configured to execute the program code to determine whether the name of the at least one file is changed by comparing an original name field value with a changed name field value of the file information associated with the at least one file with the changed name included in the file management table.

15. The electronic device of claim 11, wherein the processor is further configured to execute the program code to whether the name of the at least one file is changed according to flag field values of respective files included in the file management table.

16. The electronic device of claim 11, wherein the processor is further configured to execute the program code to:

detect, in response to identifying that a plurality of file management tables exists, at least one file management table including the at least one file with the changed name according to first flag field values included in the respective file management tables; and determine whether the name of the at least one file is changed according to an original name field value and a changed name field value of a file stored in the at least one file management table including the at least one file with the changed name.

17. The electronic device of claim 11, wherein the processor is further configured to execute the program code to:

detect, in response to identifying that a plurality of file management tables exists, at least one file management table including the at least one file with the changed name according to second flag field values included in the respective file management tables; and determine whether the name of the at least one file is changed according to the second flag field values of respective files stored in the at least one file management table including the at least one file with the changed name.

18. The electronic device of claim 11, wherein the processor is further configured to execute the program code to maintain an original name of the at least one file stored in a memory in response to identifying that the name of the at least one file changed.

19. The electronic device of claim 11, wherein the processor is further configured to execute the program code to:

generate a header according to original names of at least one file of which a name is not changed; and transmit the message including the header associated with the at least one file of which the name is not changed.

20. The electronic device of claim 11, wherein the processor is further configured to execute the program code to:

generate the header associated with the at least one file with the changed name and the header associated with at least one file of which a name is not changed; and transmit a data packet including the header associated with the at least one file with the changed name and the header associated with the at least one file of which the name is not changed.

* * * * *